US011955035B2

(12) United States Patent
He et al.

(10) Patent No.: US 11,955,035 B2
(45) Date of Patent: Apr. 9, 2024

(54) DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Ruiting He, Hubei (CN); Xiaokang Li, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 869 days.

(21) Appl. No.: 16/979,983

(22) PCT Filed: Jun. 18, 2020

(86) PCT No.: PCT/CN2020/096677
§ 371 (c)(1),
(2) Date: Sep. 11, 2020

(87) PCT Pub. No.: WO2021/217818
PCT Pub. Date: Nov. 4, 2021

(65) Prior Publication Data

US 2023/0094116 A1 Mar. 30, 2023

(30) Foreign Application Priority Data

Apr. 30, 2020 (CN) ......................... 202010361246.7

(51) Int. Cl.
*G09F 9/30* (2006.01)

(52) U.S. Cl.
CPC .................................... *G09F 9/301* (2013.01)

(58) Field of Classification Search
CPC .... G06F 1/1652; G06F 1/1601; G06F 1/1624; G06F 3/147; H04M 1/0268; G09F 9/301; G09F 9/35; G09G 2380/02
See application file for complete search history.

(56) References Cited

U.S. PATENT DOCUMENTS 8,711,566 B2 * 4/2014 O'Brien ................ G06F 1/1652 361/724
11,361,681 B2 * 6/2022 Feng ..................... G06F 1/1624
(Continued)

FOREIGN PATENT DOCUMENTS

CN 102473654 A 5/2012
CN 205264268 U 5/2016
(Continued)

OTHER PUBLICATIONS

CN-212411481-U, Jan. 2021, Dai W (Year: 2021).*
(Continued)

*Primary Examiner* — Michael A Matey

(57) ABSTRACT

The present invention provides a display device, wherein by arranging reels at opposite ends of the flexible display screen, a difference in curling lengths between laminated films of the flexible display screen caused by an increase in a number of curling turns during curling can be effectively relieved. In addition, one end of the inner roll can reduce the stress generated at one end of the outer roll, thereby preventing the layers from falling off, which is beneficial to increase the service life of the flexible display screen.

7 Claims, 2 Drawing Sheets

(56) References Cited

U.S. PATENT DOCUMENTS

| | | | | |
|---|---|---|---|---|
| 2005/0176470 | A1* | 8/2005 | Yamakawa | G09G 3/001 455/566 |
| 2010/0134873 | A1* | 6/2010 | van Lieshout | G09F 11/29 428/411.1 |
| 2012/0097313 | A1 | 4/2012 | Odawara et al. | |
| 2014/0194165 | A1* | 7/2014 | Hwang | G06F 3/147 455/566 |
| 2016/0165717 | A1 | 6/2016 | Lee et al. | |
| 2016/0209879 | A1* | 7/2016 | Ryu | G06F 1/1652 |
| 2020/0192434 | A1* | 6/2020 | Huang | G06F 1/1681 |
| 2020/0336577 | A1* | 10/2020 | Han | G09F 9/301 |
| 2021/0407336 | A1* | 12/2021 | Chen | G09F 9/33 |

FOREIGN PATENT DOCUMENTS

| | | | |
|---|---|---|---|
| CN | 106504649 | A | 3/2017 |
| CN | 106981254 | A | 7/2017 |
| CN | 208368047 | U | 1/2019 |
| CN | 110211501 | A | 9/2019 |
| CN | 110738930 | A | 1/2020 |

OTHER PUBLICATIONS

CN-112435579-B, Nov. 2021, Cai B (Year: 2021).*
CN-206039368-U, Mar. 2017, Cheng J (Year: 2017).*
CN-200944245-Y, Sep. 2007, Shi L (Year: 2007).*

* cited by examiner

DISPLAY DEVICE

BACKGROUND OF INVENTION

Field of Invention

The present invention relates to the field of display technology, in particular to a display device.

Description of Prior Art

Active matrix organic light-emitting diodes (AMOLED) are expected to be substitute liquid crystals and become a mainstream choice for next-generation displays due to their high contrast, wide viewing angles, fast response speeds, and flexibility.

At present, a curlable and flexible panel can be manufactured to have a curling diameter of 10 mm to 5 mm, but because accessories such as a drive motherboard, a battery, and so on have not achieved breakthrough on curling technology, an application field of the curling display panel is severely restricted. The industry predicts that curling display will be widely used after 2023.

However, as a curling screen increases with a number of curling turns, a curling thickness between laminated layers of the panel is increased, and the difference in film stresses between an inner and an outer panels becomes larger and larger (the film stress of the outer roll is greater, and the film stress of the inner ring is smaller). As shown in FIG. 1, when a curling range does not reach 100% of a length of the entire panel, partial peeling 10 will occur.

SUMMARY OF INVENTION

An object of the present invention is to provide a display device that can realize curling of the flexible display screen without partial peeling.

In order to achieve the above object, the present invention provides a display device including: a flexible display screen; a first reel disposed at one end of the flexible display screen and connected to the flexible display screen, wherein when the flexible display screen needs to be curled, the first reel is rotated to make a bottom surface of the flexible display screen wrap around the first reel, and when the flexible display screen needs to be uncurled, the first reel is rotated in reverse to release the flexible display screen; and a second reel disposed at another end of the flexible display screen and connected to the flexible display screen, wherein when the flexible display screen needs to be curled, the second reel is rotated to make a top surface of the flexible display screen wrap around the second reel, and when the flexible display screen needs to be uncurled, the second reel is rotated in reverse to release the flexible display screen.

Further, when the flexible display screen needs to be curled, both the first reel and the second reel are rotated counterclockwise and approach a middle of the flexible display screen at the same time; and when the flexible display screen needs to be uncurled, both the first reel and the second reel are rotated clockwise and move away from the middle of the flexible display screen at the same time.

Further, the display device further includes: an auxiliary shaft disposed between the second reel and the flexible display screen, wherein the flexible display screen is connected to the second reel via the auxiliary shaft.

Further, the auxiliary shaft is disposed below the flexible display screen and is in contact with the bottom surface of the flexible display screen.

Further, the auxiliary shaft is rotated in a direction opposite to a direction in which the second reel is rotated.

Further, the first reel and the second reel are driven by a driving motor.

Further, the display device further includes: a housing disposed under the flexible display screen, wherein the housing includes a circuit board, a power battery, a signal transmission module, and a storage module.

Further, the display device further includes: a control system integrated on the circuit board and configured to control the first reel and the second reel to operate simultaneously, wherein when the display device is curled, the control system controls the first reel and the second reel to simultaneously curl the flexible display screen; and when the display device is uncurled, the control system controls the first reel and the second reel to simultaneously uncurl the flexible display screen.

Further, the display device further includes: a first reel box accommodating the first reel; and a second reel box accommodating the second reel.

Further, the flexible display screen is an organic light-emitting diode (OLED) display panel or an active-matrix organic light-emitting diode (AMOLED) display panel.

Beneficial effects of the present application are that: the present invention provides a display device, wherein by arranging reels at opposite ends of the flexible display screen, a difference in curling lengths between laminated films of the flexible display screen caused by an increase in a number of curling turns during curling can be effectively relieved. In addition, one end of the inner roll can reduce the stress generated at one end of the outer roll, thereby preventing the layers from falling off, which is beneficial to increase the service life of the flexible display screen.

BRIEF DESCRIPTION OF DRAWINGS

The specific implementations of the present application will be described in detail below with reference to the accompanying drawings, which will make the technical solutions and other beneficial effects of the present application obvious.

Figure 1:
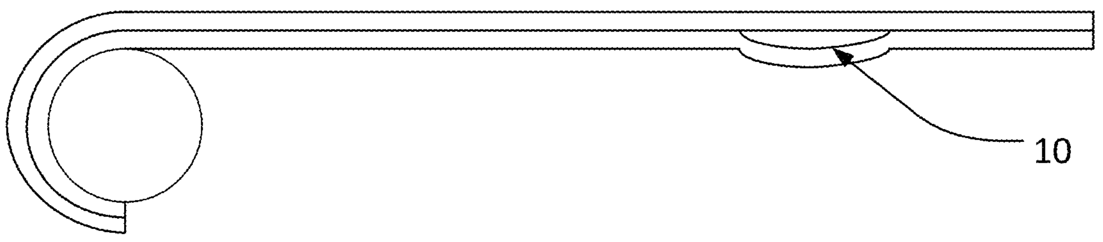
FIG. 1 is a schematic structural diagram of a curling device when curling in the prior art.

display device 100;
flexible display screen 101; first reel 102; second reel 103;
first reel box 107; second reel box 108; housing 106;
auxiliary shaft 104.

DETAILED DESCRIPTION OF PREFERRED EMBODIMENTS

The specific structural and functional details disclosed herein are merely representative and are for the purpose of describing exemplary embodiments of the present application. However, the present application may be embodied in many alternative forms and should not be construed as limited to the embodiments set forth herein.

In the description of the present invention, it is to be understood that the terms "center", "lateral", "upper", "lower", "left", "right", "vertical", "horizontal", "top", "bottom", "inside", "outside" and the like are based on the orientation or positional relationship shown in the drawings, and is merely for the convenience of describing the present invention and simplifying the description, and does not indicate or imply that the indicated devices or components must to be in particular orientations, or constructed and operated in a particular orientation, and thus are not to be construed as limiting the invention. Furthermore, the terms "first", "second", etc. in the specification and claims of the present invention and the above figures are used to distinguish similar objects, and are not necessarily used to describe a specific order or prioritization. It should be understood that the objects so described are interchangeable when it is appropriate. Moreover, the terms "including" and "having" and any variations thereof are intended to cover a non-exclusive "inclusion".

In the description of this application, it should be noted that the terms "installation", "connected", and "connected" should be understood in a broad sense unless explicitly stated and limited otherwise. For example, it can be a fixed connection, a detachable connection, or an integral connection; it can also be a mechanical connection or an electrical connection; it can be a direct connection; or it can be an indirect connection through an intermediate medium; or it can be a communication between two components.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "includes," "including," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

Figure 2:
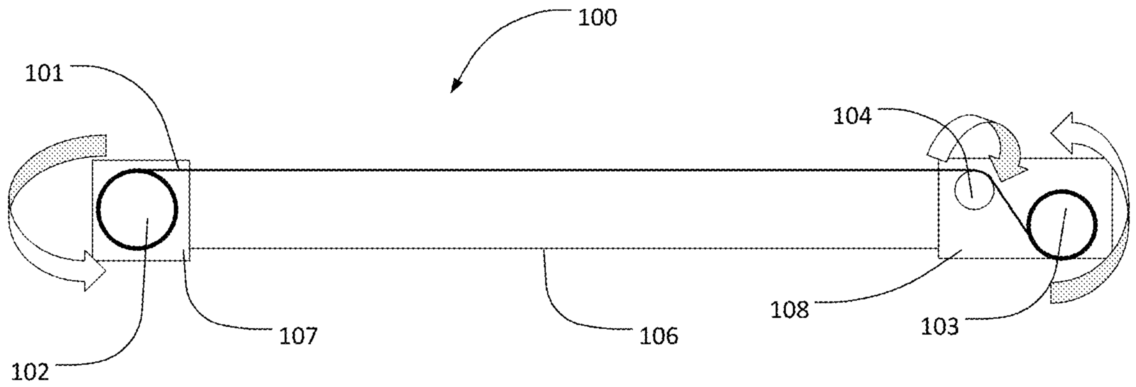
FIG. 2 is a schematic structural diagram of a display device in a curled state provided by the present invention.
Figure 3:
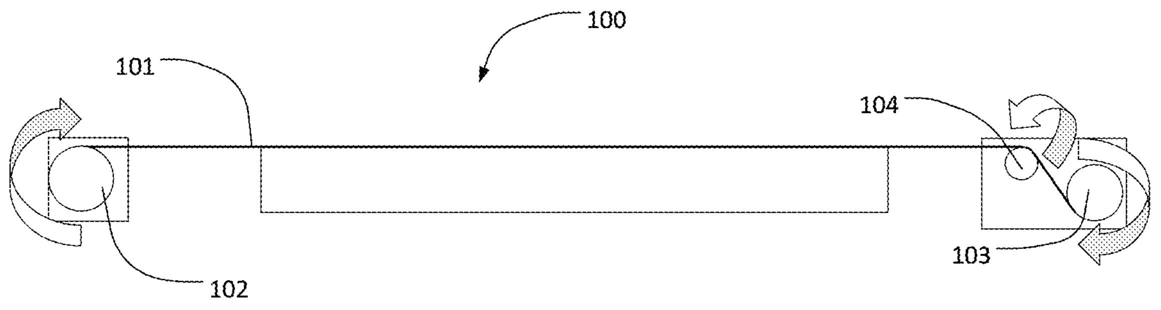
FIG. 3 is a schematic structural diagram of the display device in a uncurled state provided by the present invention.

As shown in FIG. 2 and FIG. 3, Embodiment 1 of the present invention provides a display device 100 including: a flexible display screen 101, a first reel 102, a second reel 103, a first reel box 107, and a second reel box 108.

The flexible display screen 101 is an OLED display panel or an active-matrix organic light-emitting diode (AMOLED) display panel. The flexible display screen 101 has a curling characteristic.

The first reel 102 is disposed at one end of the flexible display screen 101 and connected to the flexible display screen 101, wherein when the flexible display screen 101 needs to be curled, the first reel 102 is rotated to make a bottom surface of the flexible display screen wrap around the first reel 102, and when the flexible display screen 101 needs to be uncurled, the first reel 102 is rotated in reverse to release the flexible display screen 101.

The first reel 102 is installed in the first reel box 107.

The second reel 103 is disposed at another end of the flexible display screen 101 and connected to the flexible display screen 101, wherein when the flexible display screen 101 needs to be curled, the second reel 103 is rotated to make a top surface of the flexible display screen 101 wrap around the second reel 103, and when the flexible display screen 101 needs to be uncurled, the second reel 103 is rotated in reverse to release the flexible display screen 101.

The second reel 103 is installed in the second reel box 108.

Specifically, when the flexible display screen 101 needs to be curled, both the first reel 102 and the second reel 103 are rotated counterclockwise and approach a middle of the flexible display screen 101 at the same time.

When the flexible display screen 101 needs to be uncurled, both the first reel 102 and the second reel 103 are rotated clockwise and move away from the middle of the flexible display screen 101 at the same time.

The first reel 102 and the second reel 103 are driven by a driving motor.

When the display device 100 is curled, the first reel 102 and the second reel 103 simultaneously curl the flexible display screen 101; when the display device 100 is uncurled, the first reel 102 and the second reel 103 simultaneously unwind the flexible display screen 101.

The display device 100 further includes an auxiliary shaft 104, the auxiliary shaft 104 is provided between the second reel 103 and the flexible display screen 101, and the flexible display screen 101 is connected to the second reel 103 via the auxiliary shaft 104.

The auxiliary shaft 104 is located below the flexible display screen 101 and is in contact with a bottom surface of the flexible display screen 101.

The auxiliary shaft 104 is configured to assist the second reel 103 to curl the flexible display screen 101 to prevent the flexible display screen 101 from being pulled or torn, and the auxiliary shaft 104 is rotated in a direction opposite to a direction in which the second reel 103 is rotated.

Specifically, when the flexible display screen 101 needs to be curled, the second reel 103 rotates counterclockwise, and the auxiliary shaft 104 rotates clockwise. When the flexible display screen 101 needs to be uncurled, the second reel 103 rotates clockwise, and the auxiliary shaft 104 rotates counterclockwise.

In this way, by arranging two reels, one for the outer roll and the other for the inner roll, the problem of a difference in curling lengths between laminated films of the flexible display screen 101 caused by an increase in a number of curling turns during curling can be effectively relieved, thereby preventing the layers from falling off, which is beneficial to increase the service life of the flexible display screen 101.

That is, by providing two reels, which respectively curl the flexible display screen 101 from opposite ends of the flexible display screen 101 at the same time, a number of curling turns of the flexible display screen 101 can be reduced, thereby preventing the difference in curling lengths from becoming larger, and the end where the inner roll is located can reduce the stress generated at the end where the outer roll is located and prevent the film from peeling off.

The so-called outer roll is that a top surface of the flexible display screen 101 is wrapped around a reel, and the so-called inner roll is that a bottom surface of the flexible display screen 101 is wrapped around the reel.

Figure 4:
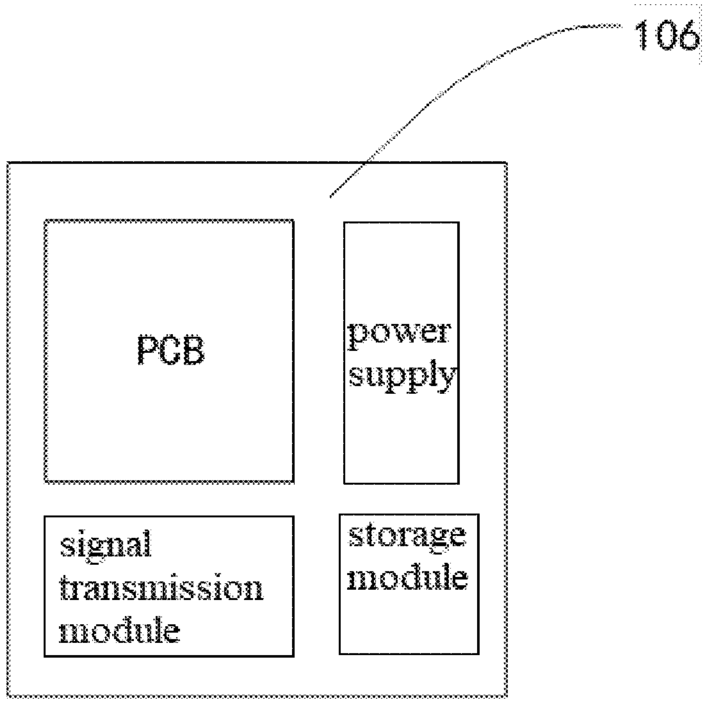
FIG. 4 is a schematic structural diagram of an internal structure of a housing provided by the present invention.

Referring to FIG. 2 and FIG. 4, the display device 100 further includes a housing 106, and the housing 106 is disposed under the flexible display screen 101. As shown in FIG. 2, the housing 106 includes a circuit board (PCB), a power battery, a signal transmission module, and a storage module.

The circuit board is integrated with a control system, and the control system is configured to control the first reel 102 and the second reel 103 to operate simultaneously.

When the display device 100 is curled, the control system controls the first reel 102 and the second reel 103 to simultaneously curl part of the flexible display screen 101. The control system transmits signals to the first reel 102 and the second reel 103 through the signal transmission module.

When the display device 100 is uncurled, the control system controls the first reel 102 and the second reel 103 to simultaneously uncurl part of the flexible display screen 101.

The present invention provides a display device 100, wherein by arranging reels at opposite ends of the flexible display screen 101, a difference in curling lengths between laminated films of the flexible display screen 101 caused by an increase in a number of curling turns during curling can be effectively relieved. In addition, one end of the inner roll can reduce the stress generated at one end of the outer roll, thereby preventing the layers from falling off, which is beneficial to increase the service life of the flexible display screen 101.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display device, comprising:

a flexible display screen;

a first reel disposed at one end of the flexible display screen and connected to the flexible display screen, wherein the first reel is rotatable to make a bottom surface of the flexible display screen wrap around the first reel so that the flexible display screen is curled, and the first reel is rotatable in reverse to release the flexible display screen so that the flexible display screen is uncurled;

a second reel disposed at another end of the flexible display screen and connected to the flexible display screen, wherein the second reel is rotatable to make a top surface of the flexible display screen wrap around the second reel so that the flexible display screen is curled, and the second reel is rotatable in reverse to release the flexible display screen so that the flexible display screen is uncurled; and an auxiliary shaft disposed between the second reel and the flexible display screen, wherein the flexible display screen is connected to the second reel via the auxiliary shaft, the auxiliary shaft is disposed below the flexible display screen and is in contact with the bottom surface of the flexible display screen, and the auxiliary shaft is rotatable in a direction opposite to a direction in which the second reel is rotatable.

2. The display device of claim 1, wherein both the first reel and the second reel are rotatable counterclockwise to approach a middle of the flexible display screen so that the flexible display screen is curled; and both the first reel and the second reel are rotatable clockwise to move away from the middle of the flexible display screen so that the flexible display screen is uncurled.

3. The display device of claim 1, wherein the first reel and the second reel are drivable by a driving motor.

4. The display device of claim 1, further comprising: a housing disposed under the flexible display screen, wherein a circuit board, a power battery, a signal transmitting module, and a storage module are contained in the housing.

5. The display device of claim 4, further comprising: a control system integrated on the circuit board and configured to control the first reel and the second reel to operate simultaneously, wherein when the display device is folded, the control system controls the first reel and the second reel to simultaneously curl the flexible display screen; and when the display device is unfolded, the control system controls the first reel and the second reel to simultaneously uncurl the flexible display screen.

6. The display device of claim 1, further comprising:

a first reel box accommodating the first reel; and a second reel box accommodating the second reel.

7. The display device of claim 1, wherein the flexible display screen is an organic light-emitting diode (OLED) display panel or an active-matrix organic light-emitting diode (AMOLED) display panel.

* * * * *